(12) United States Patent
Kinsley

(10) Patent No.: US 9,633,179 B2
(45) Date of Patent: Apr. 25, 2017

(54) CENTRALIZED LICENSING SERVICES

(75) Inventor: Michael Kinsley, Reno, NV (US)

(73) Assignee: IGT, Las Vegas, NV (US)

( * ) Notice: Subject to any disclaimer, the term of this patent is extended or adjusted under 35 U.S.C. 154(b) by 1063 days.

(21) Appl. No.: 13/608,950

(22) Filed: Sep. 10, 2012

(65) Prior Publication Data

US 2013/0012308 A1 Jan. 10, 2013

Related U.S. Application Data

(62) Division of application No. 11/725,853, filed on Mar. 19, 2007, now Pat. No. 8,285,646.

(51) Int. Cl.
*A63F 9/24* (2006.01)
*G06F 21/10* (2013.01)
*G07F 17/32* (2006.01)

(52) U.S. Cl.
CPC .............. *G06F 21/10* (2013.01); *G07F 17/32* (2013.01); *G07F 17/3244* (2013.01); *G06F 2221/2109* (2013.01)

(58) Field of Classification Search
None
See application file for complete search history.

(56) References Cited

U.S. PATENT DOCUMENTS

| | | |
|---|---|---|
| 6,254,483 B1 | 7/2001 | Acres |
| 6,264,560 B1 | 7/2001 | Goldberg et al. |
| 6,502,079 B1 | 12/2002 | Ball et al. |
| 6,817,948 B2 | 11/2004 | Pascal et al. |
| 6,923,720 B2 | 8/2005 | Loose |
| 7,089,212 B2 | 8/2006 | Schull |
| 7,103,663 B2 | 9/2006 | Inoue et al. |
| 7,127,069 B2 | 10/2006 | Nguyen |

(Continued)

FOREIGN PATENT DOCUMENTS

| | | |
|---|---|---|
| CN | 101783047 | 7/2010 |
| EP | 1 363 252 | 11/2003 |

(Continued)

OTHER PUBLICATIONS

US Office Action dated Sep. 14, 2009 issued in U.S. Appl. No. 11/225,408.

(Continued)

*Primary Examiner* — John Hayes
*Assistant Examiner* — Jason Fenstermacher
(74) *Attorney, Agent, or Firm* — Neal, Gerber & Eisenberg LLP

(57) ABSTRACT

Methods and devices are provided for central management of licenses, particularly those relating to wagering games. A license proxy deployed in and/or dedicated to a gaming establishment may operate under the control of a central licensing manager controlled by another entity, e.g., by a game provider. The license proxy may receive requests to enable features of an electronic gaming machine of the gaming establishment (e.g., game themes, player tracking features and/or peripheral device features) and determine, based on information provided by the central licensing manager, whether to grant such requests. The license proxy may also process requests to enable features of other devices in a gaming establishment, such as server-based features.

9 Claims, 10 Drawing Sheets

(56) References Cited

U.S. PATENT DOCUMENTS

| | | |
|---|---|---|
| 7,430,754 B2 | 9/2008 | Speare et al. |
| 7,464,058 B2 | 12/2008 | Yen et al. |
| 7,467,404 B2 | 12/2008 | McAllister et al. |
| 7,480,857 B2 | 1/2009 | Benbrahim et al. |
| 7,515,718 B2 | 4/2009 | Nguyen et al. |
| 7,555,126 B2 | 6/2009 | Okada et al. |
| 8,033,913 B2 | 10/2011 | Cockerille et al. |
| 8,152,628 B2 | 4/2012 | Kinsley et al. |
| 2002/0013772 A1 | 1/2002 | Peinado |
| 2002/0071557 A1 | 6/2002 | Nguyen |
| 2002/0085720 A1 | 7/2002 | Okada et al. |
| 2002/0116615 A1 | 8/2002 | Nguyen et al. |
| 2002/0188533 A1* | 12/2002 | Sanchez ............ G06Q 40/12 705/30 |
| 2003/0005135 A1 | 1/2003 | Inoue et al. |
| 2003/0176218 A1 | 9/2003 | LeMay et al. |
| 2004/0098348 A1 | 5/2004 | Kawasaki et al. |
| 2004/0230683 A1 | 11/2004 | Adamczyk et al. |
| 2004/0248642 A1 | 12/2004 | Rothschild |
| 2005/0038753 A1 | 2/2005 | Yen et al. |
| 2005/0054431 A1 | 3/2005 | Walker et al. |
| 2005/0119977 A1 | 6/2005 | Raciborski |
| 2005/0153778 A1 | 7/2005 | Nelson et al. |
| 2005/0192099 A1* | 9/2005 | Nguyen ............... G06F 21/10 463/42 |
| 2006/0059421 A1 | 3/2006 | Benbrahim et al. |
| 2006/0258428 A1 | 11/2006 | Blackburn et al. |
| 2006/0264256 A1 | 11/2006 | Gagner et al. |
| 2007/0004506 A1 | 1/2007 | Kinsley et al. |
| 2007/0026935 A1 | 2/2007 | Wolf et al. |
| 2007/0026942 A1 | 2/2007 | Kinsley et al. |
| 2007/0060363 A1 | 3/2007 | Nguyen et al. |
| 2007/0136817 A1 | 6/2007 | Nguyen |
| 2007/0198428 A1* | 8/2007 | Satkunanathan ...... G06Q 30/06 705/59 |
| 2008/0234046 A1 | 9/2008 | Kinsley |
| 2011/0218038 A1 | 9/2011 | Kinsley et al. |
| 2012/0165094 A1 | 6/2012 | Kinsley et al. |

FOREIGN PATENT DOCUMENTS

| | | | |
|---|---|---|---|
| GB | 2 042 234 | | 9/1980 |
| JP | 2004-180972 A | † | 7/2004 |
| JP | 2005-531370 A | † | 10/2005 |
| WO | WO 2007/016402 | | 2/2007 |
| WO | WO 2007/016439 | | 2/2007 |

OTHER PUBLICATIONS

US Notice of Allowance dated Jul. 26, 2010 issued in U.S. Appl. No. 11/225,408.
US Office Action dated May 31, 2011 issued in U.S. Appl. No. 11/225,408.
US Office Action dated Aug. 11, 2011 issued in U.S. Appl. No. 11/225,408.
US Notice of Allowance dated Dec. 5, 2011 issued in U.S. Appl. No. 11/225,408.
US Office Action dated Sep. 2, 2011 issued in U.S. Appl. No. 11/725,853.
US Final Office Action dated Feb. 6, 2012 issued in U.S. Appl. No. 11/725,853.
US Applicant Initiated Interview Summary dated Jun. 5, 2012 issued in U.S. Appl. No. 11/725,853.
US Notice of Allowance dated Jun. 26, 2012 issued in U.S. Appl. No. 11/725,853.
PCT International Search Report dated Nov. 22, 2006 issued in PCT/US2006/029625 [WO 2007/016439].
PCT Written Opinion dated Nov. 22, 2006 issued in PCT/US2006/029625 [WO 2007/016439].
PCT International Search Report dated Jan. 24, 2007 issued in PCT/U52006/029550 [WO 2007/016402].
PCT Written Opinion dated Jan. 24, 2007 issued in PCT/US2006/029550 [WO 2007/016402].
PCT International Preliminary Report on Patentability and Written Opinion dated Feb. 5, 2008 issued in PCT/US2006/029550.
Australian Examiner's first report dated Oct. 29, 2010 issued in Application No. 2006275655.
Australian Examiner's report No. 2 dated Oct. 6, 2011 issued in Application No. 2006275655.
Chinese First Office Action dated Jun. 26, 2009 issued in Application No. 200680028398.3.
Chinese Second Office Action dated Feb. 5, 2010 issued in Application No. 200680028398.3.
Chinese Third Office Action dated Nov. 3, 2011 issued in Application No. 200680028398.3.
Chinese Fourth Office Action dated Feb. 29, 2012 issued in Application No. 200680028398.3.
EP Examination Report dated Sep. 8, 2008 issued in European Patent App No. 06788873.5.
Mexican Official Action dated Mar. 18, 2011 issued in Patent App No. 2008/001566.
PCT International Search Report and Written Opinion dated Sep. 3, 2008 issued in Application No. PCT/US2008/055387.
Australian Examiner's First Report dated Mar. 22, 2012 issued in Application No. 2008229176.
European Office Action dated Feb. 4, 2010 issued in Application No. 08 731 041.3.
Kohno et al., "Remote Physical Device Fingerprinting", http://www.caida.org/outreach/papers/2005/fingerprinting/index.xml, Presented at the *IEEE Symposium on Security and Privacy*, May 8-11, 2005, 15 pp.

\* cited by examiner
† cited by third party

| Status 405 | Feature Level 410 |
|---|---|
| 1 | A |
| 2 | B |
| 3 | C |
| 4 | Denial |

CENTRALIZED LICENSING SERVICES

CROSS-REFERENCE TO RELATED APPLICATION

This application is a divisional application of co-pending U.S. patent application Ser. No. 11/725,853, entitled "CENTRALIZED LICENSING SERVICES" and filed on Mar. 19, 2007, which is hereby incorporated by reference in its entirety and for all purposes.

BACKGROUND OF THE INVENTION

This invention relates to networks of devices in gaming establishments, including but not limited to electronic wager gaming machines, table games, servers, kiosks, etc. More particularly, the present invention relates to methods and devices for licensing features of gaming machines and other devices in a gaming establishment. Therefore, while much of the discussion herein pertains to licensing features of electronic gaming machines, it should be understood that the present invention pertains to other types of devices.

A gaming machine may operate as a "stand alone" unit or linked in a network of some type to a group of gaming machines. As technology in the gaming industry progresses, more and more gaming services are being provided to gaming machines via communication networks that link groups of gaming machines to one or more network devices (e.g., servers) that provide gaming services and/or game themes. As an example, gaming services that may be provided by one or more servers to networked gaming machines include player tracking, accounting, cashless award ticketing, lottery, tournaments, progressive games and bonus games. Recently, the present assignee has developed methods and devices for downloading game themes, peripheral code and other software to gaming machines.

Many of these gaming features are provided, at least in part, according to proprietary software, firmware, or the like, which will generally be referred to herein as "software." For example, gaming machines may execute one or more types of game theme software and various types of peripheral software. Player tracking features of interest may involve software that executes on gaming machines and other software that executes on one or more servers. Still other player tracking software may execute on kiosks, networked table games and other devices. Much of this software is licensed, e.g., to gaming establishments.

It can be challenging to control the use of such software. Usage of licensed software may be relevant to various issues, including license fees owed by a licensee and/or copyright royalties owed by a licensor. However, it is currently not possible to obtain precise and timely license usage data. Instead, the software provider currently depends on the goodwill and cooperation of the gaming establishment to provide usage data. Similarly, if a gaming establishment fails to pay license fees, there is currently no way for a software provider to restrict or stop the use of the licensed software. It would be desirable to provide methods and devices that overcome at least some of these drawbacks of the prior art.

SUMMARY OF THE INVENTION

Methods and devices are provided for central management of licenses, particularly those relating to wagering games. A license proxy deployed in and/or dedicated to a gaming establishment may operate under the control of a central licensing manager controlled by another entity, e.g., by a game provider. The license proxy may receive requests to enable features of an electronic gaming machine of the gaming establishment (e.g., game themes, player tracking features and/or peripheral device features) and determine, based on information provided by the central licensing manager, whether to grant such requests. The license proxy may also process requests to enable features of other devices in a gaming establishment, such as server-based features.

Some embodiments of the invention provide a licensing proxy for a gaming establishment controlled by a first entity. The licensing proxy includes at least one network interface, at least one memory and a logic system. The logic system may be configured to do the following: receive, via a network interface, a first request to enable a first electronic gaming machine ("EGM") feature of a first EGM in the gaming establishment; make a determination as to whether central licensing manager ("CLM") data in a memory includes an indication provided by a CLM controlled by a second entity regarding whether requests to enable the first EGM feature should be denied; and ascertain whether to deny the first request based, at least in part, on the determination.

The licensing proxy may, for example, comprise a server. The logic system may comprise at least one logic device, such as a processor or a programmable logic device. The first EGM feature may be, for example, a game theme, a player tracking feature or a peripheral device feature.

The logic system may be configured to send a proxy request to the CLM when it is determined that the CLM has not previously provided an indication that requests to enable the first EGM feature should be denied. The proxy server request may, for example, identify a gaming establishment associated with the licensing proxy, include data regarding requests that have been denied according to the indication provided by the CLM and/or comprise a request for multiple instances of a license. The logic system may be further configured to receive license usage data from devices in the gaming establishment and provide the license usage data to the CLM.

The logic system may be further configured to receive a first CLM response and process the first request in accordance with the first CLM response. The first CLM response may indicate an approval or denial of the proxy request. The first CLM response may indicate approval of a lower-level feature instead of a requested feature.

The logic system may be further configured to do the following: receive, via at least one network interface, second through $N^{th}$ requests to enable EGM features of second through $N^{th}$ EGMs of the gaming establishment; make a determination as to whether a data structure in a memory includes an indication provided by a CLM controlled by a second entity regarding whether the second through $N^{th}$ requests should be denied; and ascertain whether to deny the second through $N^{th}$ requests based, at least in part, on the determination.

The logic system may be further configured to receive a second request to enable a first server feature of a first server of the gaming establishment and determine how to process the second request based, at least in part, on whether the CLM data indicate that the second request should be denied. The first server feature may be, for example, a bonus server feature, an accounting server feature, a tournament server feature, a player tracking server feature, a ticketing server feature or a game server feature.

In some instances, the CLM data may indicate that at least one payment from the first entity is late. In some such instances, the CLM data may indicate approval of a lower-level server feature having less functionality than the first server feature.

When CLM data in a memory includes an indication that requests to enable a feature should be denied, the logic system may be further configured to determine whether a threshold number of requests to enable the feature have been denied and to report to the CLM when it is determined that the threshold number of requests have been denied.

Alternative embodiments of the invention provide a licensing proxy for a gaming establishment controlled by a first entity. The licensing proxy includes a network interface system comprising at least one network interface, at least one memory and a logic system. The logic system may be configured to do the following: receive, via the network interface system, a first request to enable a first EGM feature of a first EGM in the gaming establishment; communicate with a CLM controlled by a second entity via the network interface system; and determine whether the first request should be granted based, at least in part, on CLM instructions.

The licensing proxy may comprise, e.g., a licensing server operating under the control of the CLM. The logic system comprises at least one logic device, such as a processor, a programmable logic device, etc. The EGM feature may comprise, e.g., a game theme, a player tracking feature or a peripheral device feature.

The CLM instructions may sometimes indicate approval of a lower-level EGM feature having less functionality than the first EGM feature. If so, the logic system may be further configured to send an authorization of the lower-level EGM feature to the first EGM via the network interface system.

The logic system may be further configured to receive a second request to enable a first server feature of a first server of the gaming establishment and determine how to process the second request based, at least in part, on the CLM instructions. The first server feature may comprise, for example, a bonus server feature, an accounting server feature, a tournament server feature, a player tracking server feature, a ticketing server feature or a game server feature.

The CLM instructions may indicate approval of a lower-level server feature having less functionality than the first server feature. If so, the logic system may be further configured to send an authorization of the lower-level server feature to the first server via the network interface system.

Alternative implementations of the invention provide a licensing method that includes the following steps: receiving, at a first device in a gaming establishment controlled by a first entity, a request to enable a first feature of a second device in the gaming establishment; communicating with a CLM controlled by a second entity via the network interface system; and determining whether the request should be granted based, at least in part, on CLM instructions.

The second device may be an EGM in the gaming establishment and first feature may be an EGM feature. The first EGM feature may comprise, for example, a game theme, a player tracking feature or a peripheral device feature.

The second device may comprise a server of the gaming establishment. Accordingly, the first feature may be a first server feature. The first server feature may comprise, e.g., a bonus server feature, an accounting server feature, a tournament server feature, a player tracking server feature, a ticketing server feature or a game server feature.

The CLM instructions may sometimes indicate approval of a lower-level feature having less functionality than the first feature. If so, the method may further comprise the step of sending an authorization of the lower-level feature to the first EGM.

Alternative methods are provided herein. One such method includes the following steps: receiving, at a device controlled by a first entity, a first request to enable a first feature for a device of a gaming establishment controlled by a second entity; determining whether a predetermined threshold has been reached; and responding to the first request, wherein a response is based at least in part upon a determination of whether the predetermined threshold has been reached.

Many different types of devices may be controlled by the first entity, e.g., a CLM controlled by a software provider and/or a licensing proxy controlled by a software provider and located in the gaming establishment.

In some instances, when it is determined that the predetermined threshold has not been reached, the response may comprise an acceptance. In other instances, when it is determined that the predetermined threshold has been reached, the response may be based, at least in part, on a predetermined rule set applicable to the threshold. The predetermined threshold may comprise, e.g., a predetermined number of licenses for the first feature, a predetermined number of times that a feature has been denied, a payment lateness threshold regarding payments made by the second entity, etc.

The predetermined threshold may be relative to other factors. For example, the predetermined threshold may comprise a predetermined number of licenses less than a maximum number of authorized licenses. The response may comprise offering additional licenses to the second entity.

The method may involve the steps of determining a degree of payment lateness and determining whether there is a lower-level feature that corresponds with the degree of payment lateness. When it is determined that there is a lower-level feature that corresponds with the degree of payment lateness, the lower-level feature may be authorized. When it is determined that there is no lower-level feature that corresponds with the degree of payment lateness, the first request may be denied.

The response may comprise revoking an authorization to provide the first feature. However, in some instances, the response may comprises removing a prior indication to deny all requests for the first feature.

The present invention provides other hardware (such as gaming machines, table games, kiosks, network devices and components of such devices) configured to perform the methods of the invention, as well as software to control devices to perform these methods.

For example, some embodiments of the invention provide a central license manager that includes the following elements: apparatus for receiving, at a device controlled by a software provider, a first request to enable a first feature for a device of a gaming establishment; apparatus for determining whether a predetermined threshold has been reached; and apparatus for providing a response to the first request, wherein the response is based at least in part upon a determination of whether the predetermined threshold has been reached.

The determining apparatus may determine that the predetermined threshold has been reached. The response may be based, at least in part, on a predetermined rule set applicable to the threshold. The predetermined threshold may comprise, for example, a predetermined number of licenses for the first feature, a payment lateness threshold regarding payments made by the second entity, etc.

The central license manager may further comprise apparatus for determining a degree of payment lateness; and apparatus for determining whether there is a lower-level feature that corresponds with the degree of payment lateness. When the determining apparatus determines that there is no lower-level feature that corresponds with the degree of payment lateness, the providing apparatus may provide a response that includes instructions to deny all requests for the first feature until further notice. When the determining apparatus determines that there is a lower-level feature that corresponds with the degree of payment lateness, the providing apparatus may provides a response authorizing the lower-level feature.

When the determining apparatus determines that there is no lower-level feature that corresponds with the degree of payment lateness, the providing apparatus may provide a response denying the first request. The response may comprise a revocation of a prior authorization to provide the first feature. However, in other circumstances, the response may indicate that a prior indication to deny all requests for the first feature should be removed.

The predetermined threshold may comprise a predetermined number of licenses less than a maximum number of authorized licenses. If so, in some instances the response may comprise offering additional licenses to the second entity.

These and other features of the present invention will be presented in more detail in the following detailed description of the invention and the associated figures.

BRIEF DESCRIPTION OF THE DRAWINGS

FIG. 4A is a table that illustrates status levels and corresponding feature levels.

EXAMPLES OF EMBODIMENTS

Figure 1:
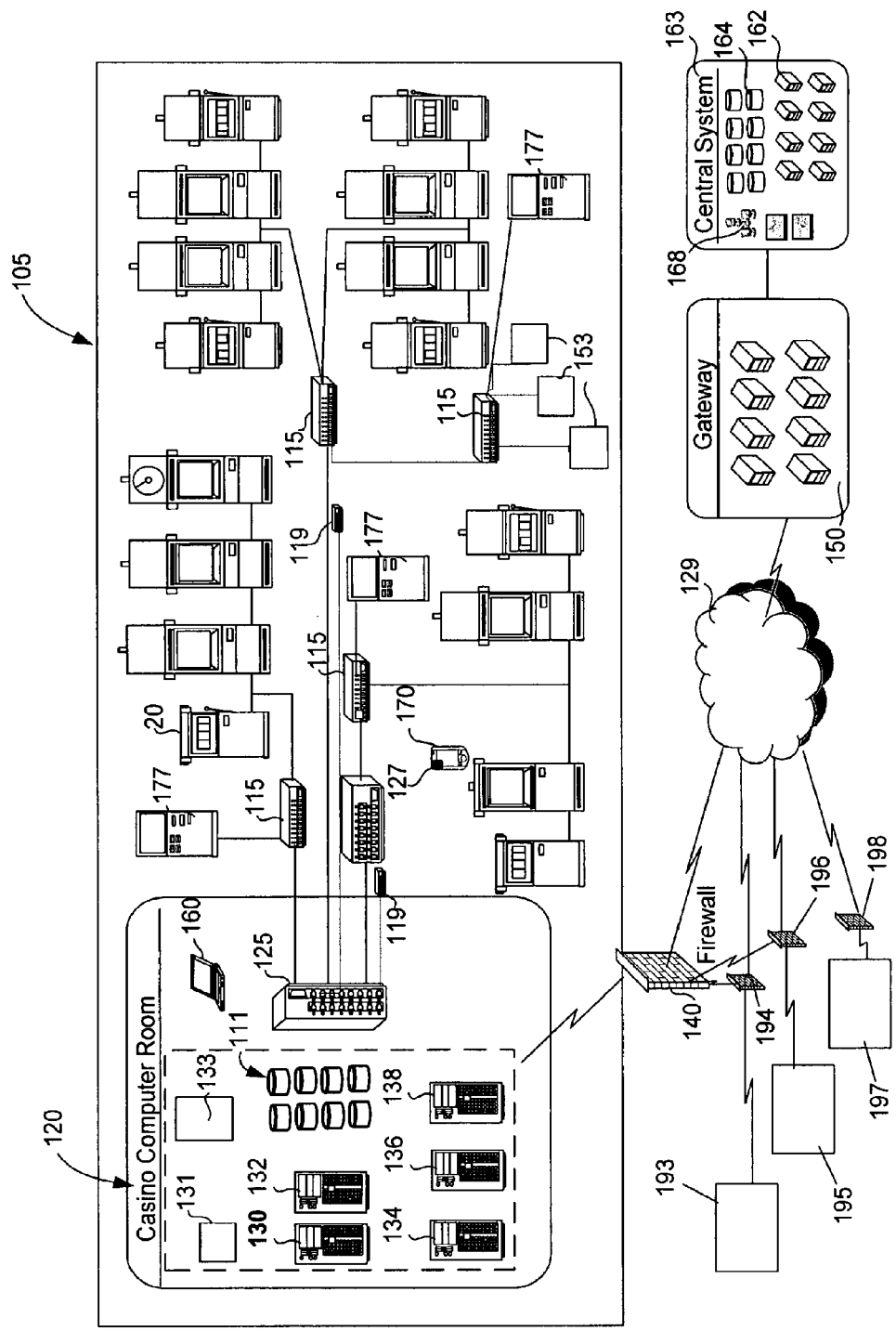
FIG. 1 illustrates one example of a network topology for implementing some aspects of the present invention.

Reference will now be made in detail to some specific examples of the invention, including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, some techniques of the present invention will be described in a particular context, e.g., licensing game and peripheral software for electronic gaming machines ("EGMs"), using related license data, etc. However, it should be understood that the present invention pertains to other types of devices, networks, license types, license data and uses of license-related data. Similarly, the context of license distribution, etc., is generally some type of gaming establishment, which may be a casino, a racetrack, a river boat, or another type of gaming establishment. However, such gaming establishments may sometimes be referred to herein as a "casino."

In the following description, numerous specific details are set forth in order to provide a thorough understanding of the present invention. Particular example embodiments of the present invention may be implemented without some or all of these specific details. In other instances, well-known process operations have not been described in detail in order not to obscure unnecessarily the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted.

Similarly, the steps of the methods shown and described herein are not necessarily all performed (and in some implementations are not performed) in the order indicated. Moreover, some implementations of the methods discussed herein may include more or fewer steps than those shown or described.

Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

According to a licensing model currently being implemented by the present assignee, customers may buy game licenses and other software licenses from a software provider's website, e.g., from IGT's website. The software provider distributes the licenses to one or more "license manager" devices at the customer's gaming establishment. At the casino, there may be multiple EGMs and a network that connects the license manager to the EGMs.

When the EGMs want to use a game, e.g., Little Green Men®, the EGM sends a corresponding request to the license manager. The license manager determines whether to approve the request according to whether there is an available license from the software provider (here, IGT). For example, the license manager may determine that the software provider has given the casino 100 licenses for Little Green Men® and only 11 are in use. In this case, the license manager would approve the request.

As the casino's license manager handles these requests, it collects license usage information. For example, the license manager may accumulate data regarding how many copies of game themes were running, what EGMs were executing the game themes, when the game themes were in use, etc.

Such usage information is important to the software provider, for various reasons. For example, the usage of licensed software may be relevant to license fees owed by a licensee, depending on the terms of the license in question.

For example, if a casino had purchased 100 usage-based licenses for an Elvis Presley game theme and used only 10 of them, the casino would only be obligated to pay for the 10 licenses it actually used. "Usage" in this context often means that the CPU is running the game code to present the game, even just an attraction sequence for a machine that no one is playing. However, "license usage" and the like are used more broadly herein, and may include data relating to specific aspects of usage, such as the times during which a game theme is actually being played, the time during which other software is actually being used.

There are other types of licenses. With some, the casino pays the same amount for a block of licenses, whether the games are used or not. Sometimes, the casinos are allowed "a percent overdraft" of extra licenses, at least to a predetermined extent required. For example, if the casino had licensed a block of 100 Little Green Men® games and had also purchased the right to at least a 10% overdraft, the casino could use up to 110 Little Green Men® licenses.

License usage information is also relevant to copyright royalties owed by a licensor, particularly for the public performance of copyrighted music and the public display of copyrighted images. Regardless of the type of license, IGT generally needs to pay copyright royalties according to usage. For example, IGT needs to pay copyright royalties to the Elvis Presley Foundation for playing an Elvis song during a game presentation, an attraction sequence, etc. Therefore, IGT would like to have the license usage information in order to pay the proper amounts for copyright royalties. However, if a casino were to purchase a block of Elvis Presley game licenses, the casino would have little incentive to provide IGT with accurate usage information.

For various reasons, it was previously not possible for a software provider such as IGT to obtain precise and timely license usage data from customers. Instead, the software provider depended on the goodwill and cooperation of the gaming establishment to provide usage data. Similarly, if a gaming establishment failed to pay license fees, there was previously no way for a software provider to restrict or stop the use of the licensed software.

The present invention provides various methods and devices to provide more effective control of software licenses and more timely license usage data. Some implementations of the invention provide for the central management of licenses, particularly those relating to wagering games. A license proxy deployed in and/or dedicated to one or more gaming establishments may operate under the control of a central licensing manager controlled by, e.g., by a game provider. The license proxy may receive requests to enable features of devices of the gaming establishment (e.g., game themes, player tracking features and/or peripheral device features) and determine, based on information provided by the central licensing manager, whether to grant such requests. Preferably, the license proxy also provides timely license usage information. The invention also provides various methods for using the license usage information.

Some examples of contexts for the invention will now be described with reference to the networks and devices depicted in FIGS. 1 and 2. Thereafter, various methods involving such devices and networks will be described with reference to the flow charts of FIG. 3 et seq.

Some gaming networks described herein allow for the convenient provisioning of networked gaming machines and other devices relevant to casino operations. Game themes may be easily and conveniently added or changed, if desired. Related software, including but not limited to player tracking software, peripheral software, etc., may be downloaded to networked gaming machines and other devices. Some such networks provide methods and devices for managing one or more networked gaming establishments. Such networks may sometimes be referred to herein as server-based gaming networks, Sb™ networks, or the like.

Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES," in U.S. patent application Ser. No. 11/225,408 by Kinsley et al., entitled "METHODS AND DEVICES FOR AUTHENTICATION AND LICENSING IN A GAMING NETWORK" and filed Aug. 1, 2005, in U.S. patent application Ser. No. 11/078,966 by Nguyen et al., filed Mar. 10, 2005 and entitled "SECURED VIRTUAL NETWORK IN A GAMING ENVIRONMENT," and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes.

One example of a gaming network and related devices is depicted in FIG. 1. Those of skill in the art will realize that this architecture and the related functionality are merely examples and that the present invention encompasses many other such embodiments and methods. Moreover, some devices that are known in the art may be used in connection with the present invention, but have been left out of the drawings and discussion in order to focus on features more directly related to the invention.

Here, casino computer room 120 and networked devices of a gaming establishment 105 are illustrated. Gaming establishment 105 is configured for communication with central system 163 via gateway 150. Gaming establishments 193 and 195 are also configured for communication with central system 163.

In some implementations, gaming establishments may be configured for communication with one another. In this example, gaming establishments 193 and 195 are configured for communication with casino computer room 120. Such a configuration may allow devices and/or operators in casino 105 to communicate with and/or control devices in other casinos. In some such implementations, a server in computer room 120 may control devices in casino 105 and devices in other gaming establishments. Conversely, devices and/or operators in another gaming establishment may communicate with and/or control devices in casino 105. For example, a proxy server of casino 105, operating under the control of a central licensing manager of central system 163, may process licensing requests and control devices in casino 105 as well as gaming establishments 193 and 195.

Here, gaming establishment 197 is configured for communication with central system 163, but is not configured for communication with other gaming establishments. Some gaming establishments (not shown) may not be in communication with other gaming establishments or with a central system.

Gaming establishment 105 includes multiple gaming machines 20, each of which is part of a bank 110 of gaming machines 20. In this example, gaming establishment 105 also includes a bank of networked gaming tables 153. It will be appreciated that many gaming establishments include hundreds or even thousands of gaming machines 20 and/or gaming tables 153, not all of which are included in a bank. However, the present invention may be implemented in gaming establishments having any number of gaming machines, gaming tables, etc.

Some gaming networks provide features for gaming tables that are similar to those provided for gaming machines, including but not limited to bonusing, player loyalty/player tracking and the use of cashless instruments. Relevant material is provided in U.S. patent application Ser. No. 11/154,833, entitled "CASHLESS INSTRUMENT BASED TABLE GAME PROMOTIONAL SYSTEM AND METHODOLOGY" and filed on Jun. 15, 2005, U.S. Provisional Patent Application No. 60/858,046, entitled "AUTOMATED PLAYER DATA COLLECTION SYSTEM FOR TABLE GAME ENVIRONMENTS" and filed on Nov. 10, 2006, U.S. patent application Ser. No. 11/129,702, entitled "WIDE AREA TABLE GAMING MONITOR AND CONTROL SYSTEM" and filed on May 15, 2005, U.S. patent application Ser. No. 11/425,998 entitled "PROGRESSIVE TABLE GAME BONUSING SYSTEMS AND METHODS", filed Jun. 22, 2006 and U.S. patent application Ser. No. 11/225,299, entitled "UNIVERSAL CASINO BONUSING SYSTEMS AND METHODS" and filed on Sep. 12, 2005, all of which are incorporated herein by reference. Accordingly, software related to such features may be provided and/or controlled according to the present invention.

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 153 may be configured for communication with individual player terminals (not shown), which may be configured to accept bets, present an electronic representation of a dealer, indicate game outcomes, etc.

Some gaming networks include electronically configurable tables for playing table games. U.S. patent application Ser. No. 11/517,861, entitled "CASINO DISPLAY METHODS AND DEVICES" and filed on Sep. 7, 2006, describes some such tables and is hereby incorporated by reference. An operator may select a desired game, such as a poker game or a blackjack game, and the table will be automatically configured with geometrical patterns, text, etc., which are appropriate for the desired table game. The desired type of table game may be selected by a control on the table itself or according to instructions received from, e.g., a server or a casino manager via a network interface.

Gaming establishment 105 also includes networked kiosks 177. Depending on the implementation, kiosks 177 may be used for various purposes, including but not limited to cashing out, prize redemption, redeeming points from a player loyalty program, redeeming "cashless" indicia such as bonus tickets, smart cards, etc. In some implementations, kiosks 177 may be used for obtaining information about the gaming establishment, e.g., regarding scheduled events (such as tournaments, entertainment, etc.), regarding a patron's location, etc. Software related to such features may be provided and/or controlled according to the present invention.

In this example, each bank 110 has a corresponding switch 115, which may be a conventional bank switch in some implementations. Each switch 115 is configured for communication with one or more devices in computer room 120 via main network device 125, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB"), Game to System ("G2S"), etc., may be used to implement various aspects of the invention. IGT has also developed a gaming-industry-specific transport layer called CASH that rides on top of TCP/IP and offers additional functionality and security.

Here, gaming establishment 105 also includes an RFID network, implemented in part by RFID switches 119 and multiple RFID readers (not shown). An RFID network may be used, for example, to track objects (such as mobile gaming devices), patrons, etc., in the vicinity of gaming establishment 105. Some examples of how an RFID network may be used in a gaming establishment are set forth in U.S. patent application Ser. No. 11/655,496, entitled "DYNAMIC CASINO TRACKING AND OPTIMIZATION" and filed on Jan. 19, 2007 and in U.S. patent application Ser. No. 11/599,241, entitled "DOWNLOADING UPON THE OCCURRENCE OF PREDETERMINED EVENTS" and filed on Nov. 13, 2006, both of which are hereby incorporated by reference.

In this example, mobile device 170 includes RFID tag 127, which includes encoded identification information for mobile device 170. Accordingly, the location of mobile device 170 in gaming establishment 105 may be tracked via the RFID network. Other location-detection devices and systems, such as the global positioning system ("GPS"), may be used to monitor the location of devices in the vicinity of gaming establishment 105 or elsewhere.

Various alternative network topologies can be used to implement different aspects of the invention and/or to accommodate varying numbers of networked devices. For example, gaming establishments with large numbers of gaming machines 20 may require multiple instances of some network devices (e.g., of main network device 125, which combines switching and routing functionality in this example) and/or the inclusion of other network devices not shown in FIG. 1. For example, some implementations of the invention include one or more middleware servers disposed between kiosks 177, RFID switches 119 and/or bank switches 115 and one or more devices in computer room 120 (e.g., a corresponding server). Such middleware servers can provide various useful functions, including but not limited to the filtering and/or aggregation of data received from switches, from individual gaming machines and from other player terminals. Some implementations of the invention include load-balancing methods and devices for managing network traffic.

Storage devices 111, Sb™ server 130, License Manager 131, Arbiter 133, servers 132, 134, 136 and 138, host device(s) 160 and main network device 125 are disposed within computer room 120 of gaming establishment 105. In practice, more or fewer devices may be used. Depending on the implementation, some such devices may reside in gaming establishment 105 or elsewhere. Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. Preferably, a Radius server and a DHCP server are also configured for communication with the gaming network. Some implementations of the invention provide one or more of these servers in the form of blade servers.

License manager 131 may also be implemented, at least in part, via one or more servers, storage devices, host devices, etc. Some exemplary operations of license manager 131 are described in detail in U.S. patent application Ser. No. 11/225,408 by Kinsley et al., entitled "METHODS AND DEVICES FOR AUTHENTICATION AND LICENSING IN A GAMING NETWORK" and filed Aug. 1, 2005 (the "License Manager application"), which is hereby incorporated by reference.

However, in preferred implementations of the invention, license manager 131 operates, at least in part, under the control of a central licensing manager. Accordingly, the implementations of licensing manager 131 discussed herein will often be referred to as a "licensing proxy" or the like. One or more servers, storage devices, switches, routers, host devices and/or other devices, e.g., of casino computer room 120, may perform the functions of a licensing proxy and may collectively comprise license manager 131.

One or more devices in central system 163 may also be configured to perform tasks specific to the present invention. For example, one or more servers 162, storage devices 164 and/or host devices 168 of central system 163 may be configured to implement the functions of a central licensing manager. The functions of a licensing proxy and central licensing manager will be described in more detail below, particularly with reference to FIG. 3 et seq.

Some preferred embodiments of Sb™ server S30 and the other servers shown in FIG. 1 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the invention, many of these devices (including but not limited to License Manager 131, servers 132, 134, 136 and 138, and main network device 125) are mounted in a single rack with Sb™ server 130. Accordingly, many or all such devices will sometimes be referenced in the aggregate as an "Sb™ server." However, in alternative implementations, one or more of these devices is in communication with Sb™ server 130 and/or other devices of the network but located elsewhere. For example, some of the devices could be mounted in separate racks within computer room 120 or located elsewhere on the network. Moreover, it can be advantageous to store large volumes of data elsewhere via a storage area network ("SAN").

Computer room 120 may include one or more operator consoles or other host devices that are configured for communication with other devices within and outside of computer room 120. Such host devices may be provided with software, hardware and/or firmware for implementing various aspects of the invention. However, such host devices need not be located within computer room 120. Wired host device 160 (which is a laptop computer in this example) and wireless device 170 (which is a PDA in this example) may be located elsewhere in gaming establishment 105 or at a remote location. Here, wireless device 170 is configured for network management tasks, but wireless devices 170 may also be configured as mobile gaming devices.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 2:
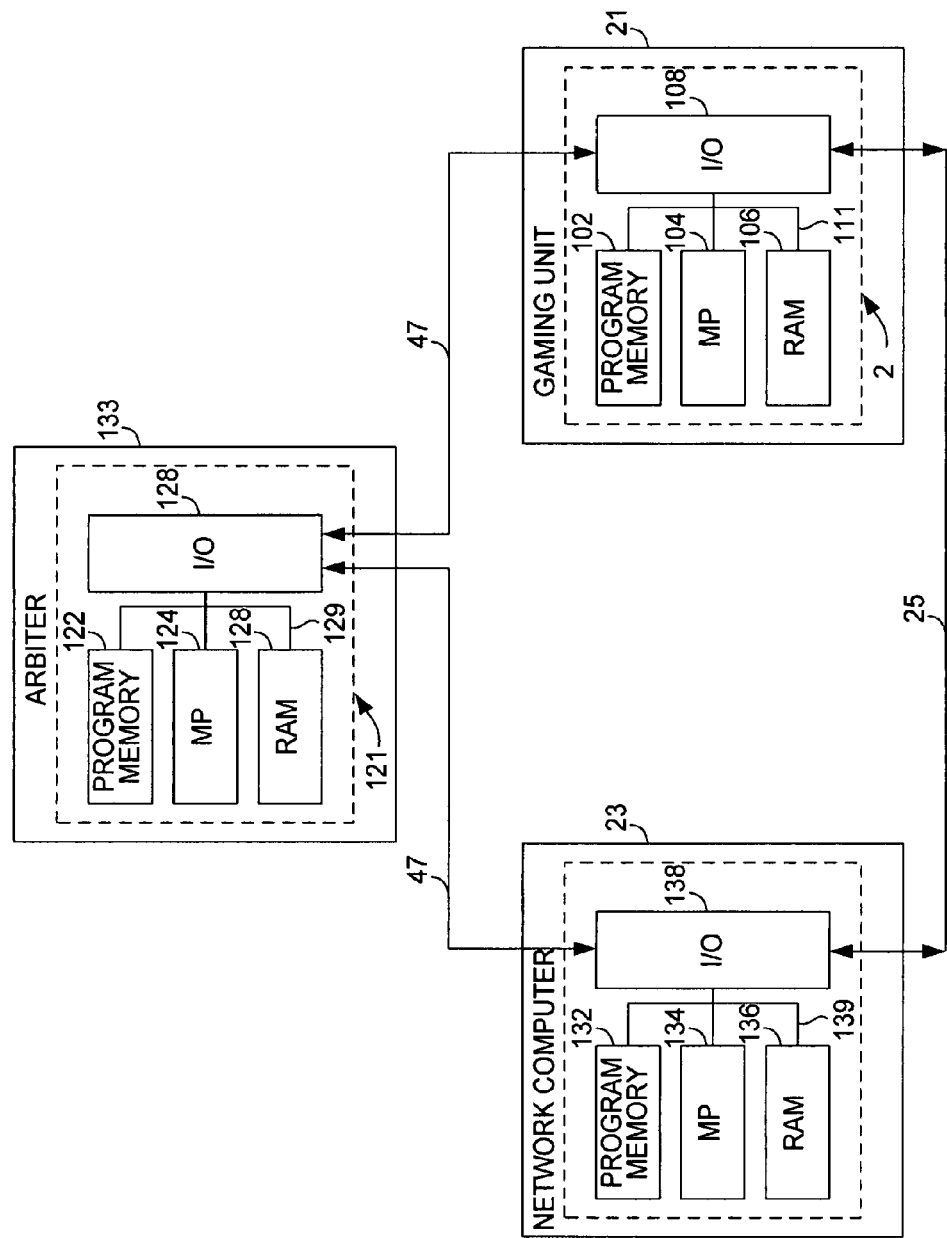
FIG. 2 is a block diagram that illustrates a simplified network topology that illustrates some implementations of an Arbiter.

FIG. 2 is a block diagram of a simplified communication topology between gaming unit 20, network computer 23 and Arbiter 133. Network computer 23 may be, for example, a server or other device within computer room 120 or elsewhere. Although only one gaming unit 20, one network computer 23 and one Arbiter 133 are shown in FIG. 2, it should be understood that the following examples may be applicable to different types of networked devices in addition to gaming unit 20 and network computer 23, and may include different numbers of network computers, gaming security arbiters and gaming units. For example, a single Arbiter 133 may be used for secure communications among a plurality of network computers 23 and tens, hundreds or thousands of gaming units 20. Likewise, multiple gaming security arbiters 46 may be utilized for improved performance and other scalability factors.

Referring to FIG. 2, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 4C as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 2 may each comprise multiple address/data buses, which may be of different types, and there may be an I/O circuit disposed between the address/data buses.

As shown in FIG. 2, the gaming unit 20 may be operatively coupled to the network computer 23 via the data link 25. The gaming unit 20 may also be operatively coupled to the Arbiter 133 via the data link 49, and the network computer 23 may likewise be operatively coupled to the Arbiter 133 via the data link 47. Communications between the gaming unit 20 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), download information (e.g., game and/or peripheral software, licensing information, etc.) and personal information (e.g., social security number, personal preferences, etc.) may be encrypted with stronger encryption techniques such as DES or 3DES to provide increased security.

As disclosed in further detail in the Arbiter application, the Arbiter 133 may verify the authenticity of each network gaming device. The Arbiter 133 may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter application.

Preferably, the communication link(s) between casino 105 and central system 163 should have ample bandwidth and may, for example, comprise one or more T1 or T3 connections and/or satellite links having comparable bandwidth, etc. Network 129 is the Internet in this example. However, it will be understood by those of skill in the art that network 129 could include any one of various types of networks, such as the public switched telephone network ("PSTN"), a satellite network, a wireless network, a metro optical transport, etc. Accordingly, a variety of protocols may be used for communication on network 129, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

If a host device is located in a remote location, security methods and devices (such as firewalls, authentication and/or encryption) should be deployed in order to prevent the unauthorized access of the gaming network.

Similarly, any other connection between gaming network 105 and the outside world should only be made with trusted devices via a secure link, e.g., via a virtual private network ("VPN") tunnel. For example, the illustrated connection between Sb™ server 130, gateway 150 and central system 163 (that may be used for communications involving peripheral device software downloads, etc.) is advantageously made via a VPN tunnel. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

Alternatively, a permanent virtual circuit ("PVC") can be established to provide a dedicated and secure circuit link between two facilities, e.g., between casino and central system 163. A PVC is a virtual circuit established for repeated use between the same data terminals. A PVC could be provided, for example, via AT&T's Asynchronous Transfer Mode ("ATM") switching fabric. Some implementations provide a dedicated line from an endpoint (e.g., from casino 105) into the ATM backbone. Other implementations provide a connection over another network (e.g., the Internet) between an endpoint and the nearest device of the ATM backbone, e.g., to the nearest edge router. In some such implementations, the fixed-sized cells used in the ATM switching fabric may be encapsulated in variable sized packets (such as Internet Protocol or Ethernet packets) for transmission to and from the ATM backbone.

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

Some network implementations may use Trusted Network Connect ("TNC"), which is an open architecture provided by the Trusted Network Connect Sub Group ("TNC-SG") of the Trusted Computing Group (TCG). TNC enables network operators to provide endpoint integrity at every network connection, thus enabling interoperability among multi-vendor network endpoints. Alternatively, or additionally, the Secure Internet File Transfer ("SIFT") may be employed. SIFT allows devices to send and receive data over the Internet in a secure (128-bit encryption) method of transport.

Providing a secure connection between the local devices of the gaming network 105 and central system 163 allows for the deployment of many advantageous features. For example, a customer (e.g., an employee of a gaming establishment) can log onto an account of central system 163 to obtain the account information such as the customer's current and prior account status. Automatic updates of a customer's software may also be enabled. For example, central system 163 may notify one or more devices in gaming establishment 105 regarding new products and/or product updates. For example, central system 163 may notify server (or other device) in computer room 120 regarding new software, software updates, the status of current software licenses, etc. Alternatively, such updates could be automatically provided to a server in computer room 120 and downloaded to networked gaming machines.

After the local server receives this information, relevant products of interest may be identified (by the server, by another device or by a human being). If an update or a new software product is desired, it can be downloaded from the central system. Similarly, a customer may choose to renew a software license via a secure connection with central system 463, e.g., in response to a notification that the software license is required.

In addition, providing secure connections between different gaming establishments can enable alternative implementations of the invention. For example, a number of gaming establishments may be owned and/or controlled by the same entity. In such situations, having secure communications between gaming establishments makes it possible for a gaming entity to use one or more servers in a gaming establishment as an interface between central system 163 and gaming machines in multiple gaming establishments. For example, new or updated peripheral device software may be obtained by a server in one gaming establishment and distributed to gaming machines in that gaming establishment and/or other gaming establishments.

Figure 3:
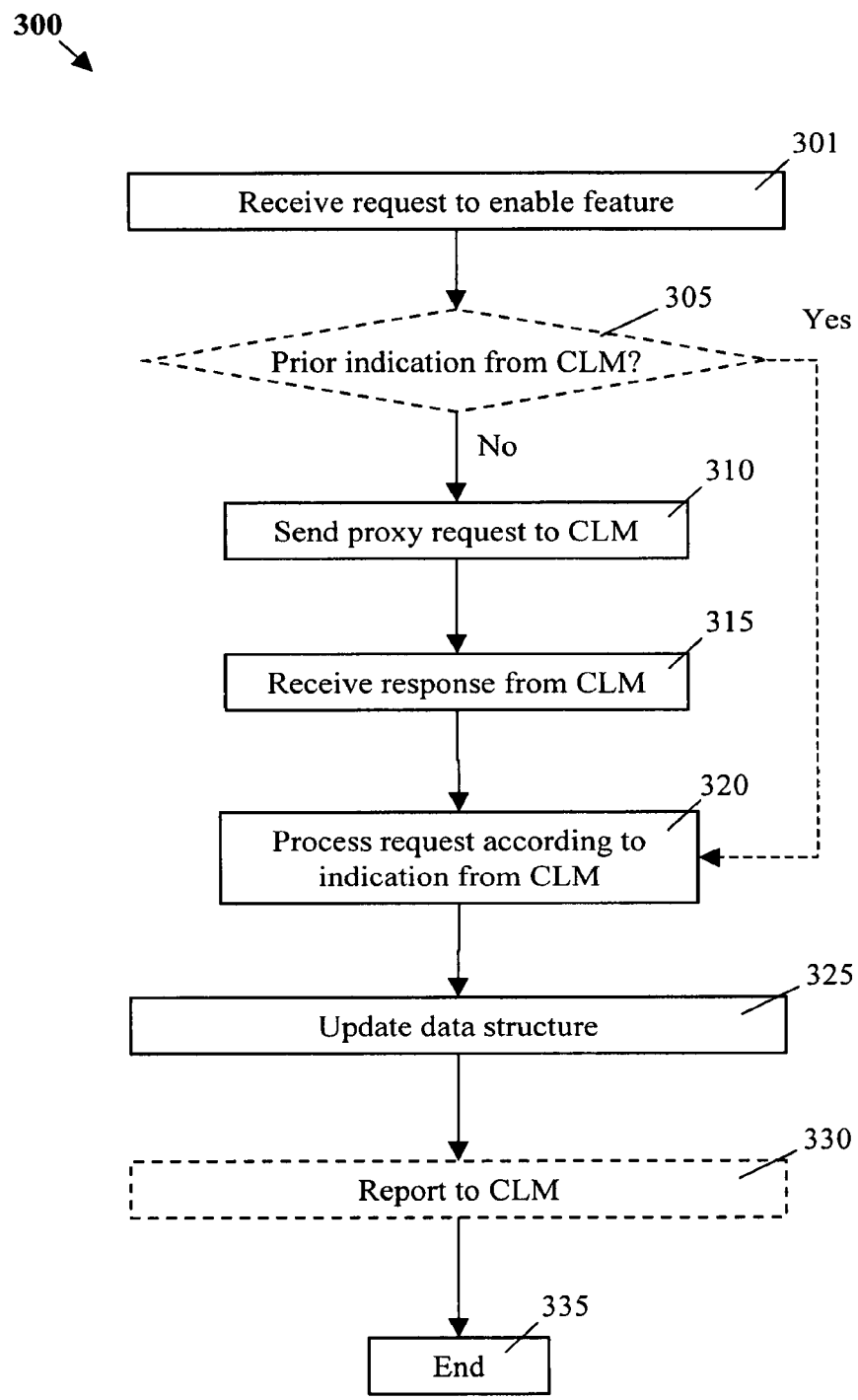
FIG. 3 is a flow chart that outlines some methods of the invention.

Method 300 of the invention will now be described with reference to FIG. 3. The steps of method 300 may be performed, for example, by one or more devices that act as a licensing proxy for a gaming establishment. In some implementations, the same device(s) may act as a licensing proxy for multiple gaming establishments.

In step 301, the licensing proxy receives a request to enable a feature of a device in a gaming establishment. In general, the feature will be implemented by software, firmware, or the like. As described elsewhere herein, the request could pertain to a feature of an EGM, a kiosk, a table game, a network device (e.g., a server) or another device. The feature may relate to a peripheral device, such as a player tracking device, a bill acceptor, a ticket printer and/or reader, a monitor, etc. The request may have been sent by the device in which the feature would be used or it may have been sent by another device. For example, a network device (such as a bank switch or an Sb™ server) may have sent a request pertaining to a feature of one or more gaming machines.

In this example, however, the feature is a game theme: an EGM has sent a request to present a Little Green Men® game. Such a request may be referred to herein as a "licensing request" or the like. However, a request to enable a feature may not directly indicate or reference a license. In this example, the EGM's request may have indicated, in essence, "Is it O.K. for me to present a Little Green Men® game?" Accordingly, such a request is also referred to herein as a "request to enable a feature" or the like.

In some implementations, the licensing proxy (or an associated device) will have retained a prior indication from a central license manager ("CLM") regarding the handling of future requests. Such a prior indication may comprise a command to process a certain category of requests (e.g., all requests for a particular feature) in a particular manner. Therefore, in optional step 305, the licensing proxy may determine whether any such prior indication from the CLM has been received and stored. If there is such a prior indication, the licensing proxy may or may not send a communication to the CLM.

For example, the prior indication may have been an indication not to approve any more license requests for a particular feature. A gaming establishment may, e.g., already be using all of the licenses for that feature available to the gaming establishment at that time. Alternatively, the gaming establishment may not have paid its licensing fees for that feature. Providing a prior indication to deny all licensing requests for a feature until further notice may promote greater efficiency and may reduce network traffic between the gaming establishment and the CLM.

If, in this example, there were a prior indication from the CLM that that no additional Little Green Men® licenses should be approved until further notice, the license proxy would process the EGM's request accordingly: in step 320, the license proxy would deny the request.

Preferred implementations of the invention involve a high degree of control of the licensing proxy by the CLM. Therefore, while there may be prior indications to deny requests to enable (or maintain) the use of features, some preferred implementations do not permit prior indications to approve such requests without requesting permission from the CLM. Alternatively, the parameters for such prior indications for approval may be tightly controlled. For example, a small number of additional approvals (e.g., 5 to 10) may be authorized without CLM approval for each one and/or additional approvals may be authorized without CLM approval for a relatively small time interval (e.g., hours or days).

It may now be more readily apparent why, in some instances, the licensing proxy may not always send a communication to the CLM if there is such a prior indication. (See optional reporting step 330.) The operators of the CLM may prefer that the licensing proxy not send a report for each individual denial of a request when the licensing proxy has a prior indication to deny all such requests. Instead, it may be preferable to have such communications bundled and reported at predetermined time intervals, after a predetermined number of denials, etc. However, in alternative implementations, each denial will be separately reported.

If there was no prior indication from the CLM, the licensing proxy will forward the request (or will send a communication of some type that indicates each request) to the CLM. (Step 310.) Such a communication will sometimes be referred to herein as a "proxy request" or the like. The communication from the licensing proxy to the CLM may include other information, such as license usage information, and may comprise licensing requests (or information regarding license requests) for more than one device and/or feature. For example, a proxy request regarding one feature (e.g., to enable a particular type of player tracking software) may include information regarding other requests (e.g., regarding requests that were denied because of a prior indication from the CLM).

In some implementations of the invention, however, step 305 is omitted. In such implementations, a proxy request will be sent to the CLM corresponding to each request to enable a feature that the licensing proxy receives.

In step 315, a response is received from the CLM. The response may take various forms, e.g., to grant the request or to deny the request. The response may indicate whether to apply the response, a rule set, etc., to future requests. For example, the response may include a command (e.g., an "prior indication" as described with reference to step 305) to deny all subsequent requests for that feature, until further notice. Such command could be revoked when conditions change, e.g., when a casino has brought its accounts current.

In some implementations, the response may indicate a "standalone grace period" or a "time to live" for an approved license. Relevant features are described in U.S. patent application Ser. No. 11/225,408 by Kinsley et al., entitled "METHODS AND DEVICES FOR AUTHENTICATION AND LICENSING IN A GAMING NETWORK" and filed Aug. 1, 2005, which is incorporated by reference herein.

Some such commands involve the detection of a predetermined threshold or condition (sometimes referred to herein as a "trigger") that will invoke a predetermined rule set and/or process. In some such implementations, a response may include a command for the license proxy to invoke a predetermined process associated with a condition, such as a late payment condition. In alternative implementations, the CLM will perform the predetermined process and the response will be a result of that process. In some instances, the resulting response may be an authorization of a lower-level version of the software than that corresponding with the requested feature. These implementations of the invention will be discussed in more detail below.

In step 320, the request is processed according to the CLM's indication, whether the CLM indication is a stored prior indication or a response received in step 315. If the response indicates some form of approval or a denial, the licensing proxy sends a corresponding indication to the appropriate device. The form of the approval may involve the issuance of a "license token" or the like, e.g., as described in U.S. patent application Ser. No. 11/078,966 by Nguyen et al., filed Mar. 10, 2005 and entitled "SECURED VIRTUAL NETWORK IN A GAMING ENVIRONMENT," which is incorporated by reference herein. In some implementations, the response from the CLM may include such a license token.

After the request has been processed, a record of the process is preferably memorialized by updating a data structure in a local memory (step 325). It will be appreciated that the sequence of steps is not crucial; for example, the data structure may be updated before a response has been sent to the local device, at approximately the same time the response is sent, etc. If the response indicates that the licensing proxy should retain a "prior indication" for processing future requests, the licensing proxy will store the indication. Preferably, as the proxy requests are processed, the CLM is also updating one or more data structures in a central system that includes the CLM.

As noted above, there may be an additional step of reporting to the CLM. (Optional step 330.) Whether this step is taken may depend on whether the licensing has denied a request pursuant to a prior indication from the CLM. The timing of the optional reporting step 330 may vary: the report may be made at predetermined time intervals, after a predetermined number of denials, etc. In some implementations, such reporting information will be sent to the CLM when a subsequent proxy request is sent.

In some implementations of the invention, the CLM will indicate either an acceptance or a denial of a request to enable (or maintain) a particular feature. In such implementations, a proxy request will either be approved or denied. As we have seen, the licensing proxy may store a prior indication to deny all subsequent requests of a particular feature until further notice.

However, other implementations of the invention may potentially provide a range of responses between approval and denial, at least for some features. For example, some features may be implemented using different versions of software that can provide relatively more or relatively fewer features. The authorized level of a feature may, in some such cases, correspond with one or more status indices, such as licensing status, payment status, etc.

For example, there may be a "bare bones" version of a player tracking system, the cheapest one that a casino could implement. This version may have minimal functionality, e.g., it may allow a player to insert a player tracking card and/or input a player tracking number at an EGM and collect points while playing a wagering game. For player tracking software with other features, a casino may pay more. If a player wants to download points or have cashable credits, credits redeemable for prizes, meals, etc., that would require a higher level of player tracking functionality.

In some implementations of the invention, these differences may be implemented on a device-by-device basis. For example, there may be a limited number of available licenses for higher-level functionality. In other implementations, these differences may be implemented for an entire gaming establishment (or group of gaming establishments). For example, in such implementations, all player tracking devices in a casino may have the same level of functionality.

However, many types of devices features may be implemented with multi-level features. For example, features of electronic tables, including multi-station tables, may be controlled in the same way.

Peripheral devices may also operate according to various levels of features. The CPU (or another logic device) of an EGM could verify what level of software a peripheral device is running. For example, ticket readers and printers may be operable according to multiple levels of available software with different capabilities, licenses for which could be controlled according to the present invention. In the past, there were often disputes as to the amount of ticket in/ticket out ("TITO") fees due from gaming establishments. The present invention can regulate the use of applicable software and provide hard data upon which appropriate fees may be based.

Servers such as bonusing servers, ticketing servers, player tracking servers, accounting servers, tournament servers, etc., may also operate according to different versions of software having different levels of functionality. There may be, for example, a license client inside such servers. When a server initializes (or at other times), the server may request a license. The proxy could pass on the request, as above.

For example, a tournament server may request a license for a particular level of tournament-enabling software. If approved, the tournament server will be allowed to run according to the requested feature level. However, the server will only be allowed to operate according to the functions corresponding to the level of its license. In this example, there could be basic, intermediate and high-level tournament server licenses. The tournament server will not be able to offer the full range of tournaments unless the casino purchases the highest level of tournament server license.

If, for example, the customer initially has the highest level of tournament server license but then does not pay its bill, a CLM controlled by the software provider could revoke the tournament server license. Alternatively, the CLM could first downgrade the tournament server license, then revoke the tournament server license if the customer does not pay its bill within a predetermined period of time. The determination may be made with reference to a particular feature or with references to all accounts with that customer.

FIG. 4A indicates table 400, which represents a simple data structure of status levels 405 and corresponding feature levels 410. It will be appreciated that the numbers of status levels and feature levels are merely examples provided for the sake of discussion. Such a data structure may be stored in a storage device accessible by a CLM and may correspond with a rule set implemented by the CLM for controlling the licensing of multiple feature levels. In alternative implementations, however, such a data structure may be stored in a storage device accessible by a licensing proxy and may correspond with a rule set implemented by the licensing proxy.

In this example, status level 1 is the highest status level. Status level 1 may indicate, for example, that a customer has a license for the highest level of the feature (here, level A). Moreover, status level 1 may correspond to an account status of "current" or the like, i.e., that no payment is overdue. A status level may also reflect a customer's account history. In this example, a customer may need to maintain (or average) at least a threshold level of payment timeliness in order to qualify for the highest status level.

Status level 2 is the second-highest level and corresponds to feature level B, which is a lower-level feature than level A. Status level 2 may indicate a less favorable payment history and/or a current degree of lateness (e.g., late but within 30 days). However, status level 2 may simply indicate that a client (e.g., a gaming establishment) has entered into a license for feature level B, with no indication of late payments, etc.

Similarly, status level 3 may indicate an even less favorable payment history and/or a current degree of lateness (e.g., 30 to 60 days late). On the other hand, status level 3 may simply indicate that a client (e.g., a gaming establishment) has entered into a license for feature level C, with no indication of late payments, etc.

In this example, status level 4 means that the feature will not be enabled. This could indicate an even worse payment history and/or a current degree of lateness (e.g., more than 60 days late). However, status level 4 may indicate other conditions, e.g., that the client has not entered into a license for the feature, that the client's license has lapsed, etc.

Figure 4B:
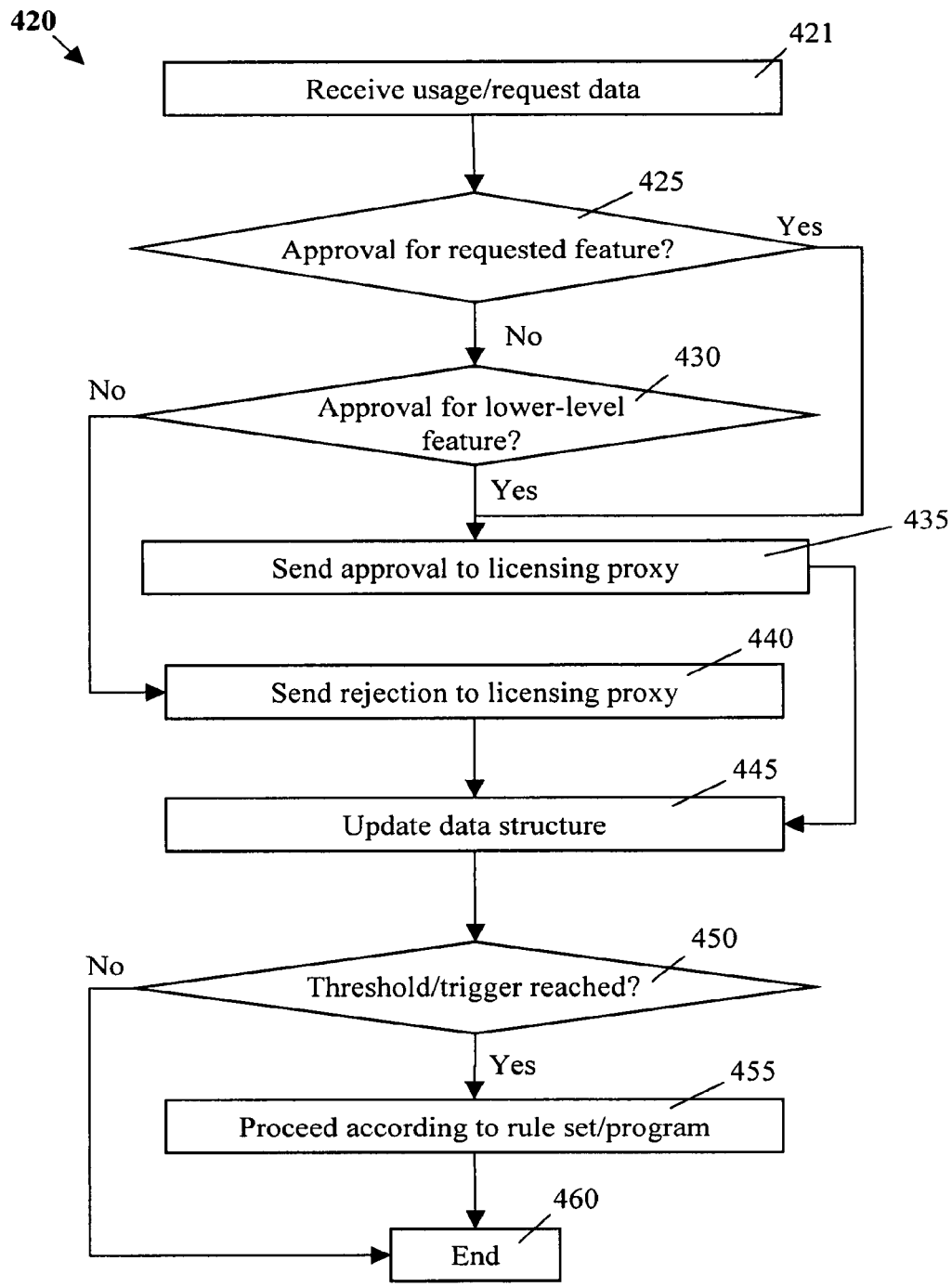
FIG. 4B is a flow chart that outlines some methods of the invention.

FIG. 4B indicates the steps of method 420, which may be used to control the licensing of some such multi-level features. In this example, the steps are performed by a CLM. In step 421, the CLM receives a request for a particular feature and level. In this example, the request is for the highest level of a particular feature, e.g., for a level A feature of FIG. 4A. The CLM may also receive other pertinent information (perhaps after querying a database), e.g., payment data, current license usage data, data regarding whether other feature levels are available, etc.

In step 425, the CLM determines whether to grant the request for the level A feature. If the request is granted, the CLM sends an approval to the licensing proxy (step 435) and updates a data structure to indicate the current status. (Step 445.)

However, one or more criteria may indicate that a level A feature should not be approved. In this case, the customer has a license for the level A feature, but the customer's account is 20 days late. Therefore, the process continues to step 430.

The CLM then determines that there is a level B feature associated with this degree of lateness. Therefore, the CLM sends an authorization for this lower-level feature to the licensing proxy (step 435). In some situations, however, the request will be rejected. (Step 440.) For example, there may not be a lower-level feature than the requested feature, e.g., because the feature has only one feature level. Alternatively, there may not be a lower-level feature that corresponds with the client's status, e.g., with the degree of payment lateness indicated by the client's account information. Whatever the determination of steps 425 and/or 430, the CLM updates a data structure to indicate the current status. (Step 445.)

In this example, the CLM then determines whether a threshold or trigger point has been reached. (Step 450.) It will be appreciated that in some implementations, this step may be performed earlier, e.g., prior to step 425. If the CLM determines that such a threshold has been attained, the CLM will proceed according to a predetermined rule set, which may be implemented via software. (Step 455.) Examples of some such thresholds and rule sets will be discussed below with reference to FIG. 6.

Figure 5:
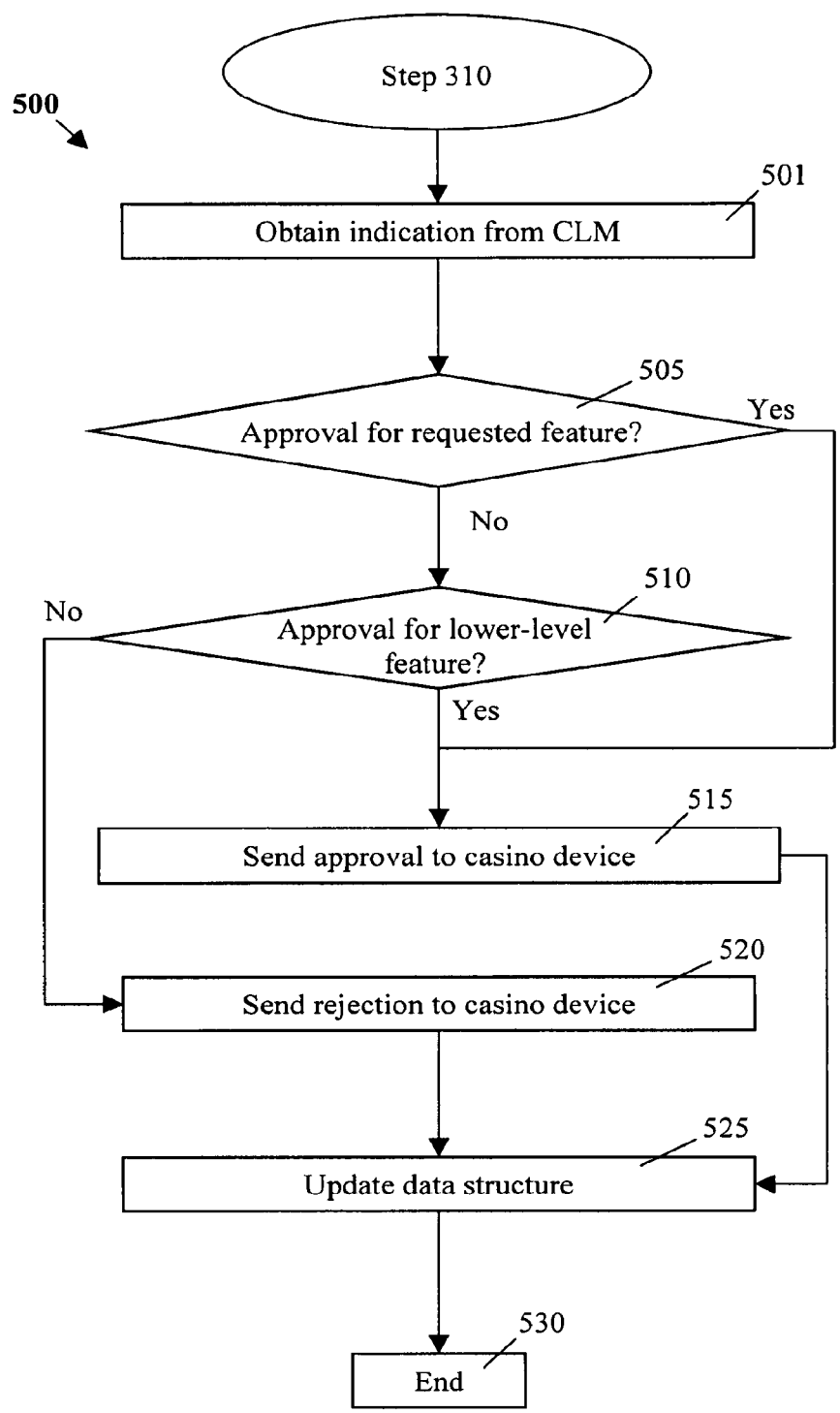
FIG. 5 is a flow chart that outlines a method according to some aspects of the invention.

FIG. 5 indicates steps of method 500, which may be performed by a licensing proxy. The steps of method 500 follow step 310, wherein a proxy request was sent to the CLM. In step 501, a responsive indication is received from the CLM. The indication may be an express indication (e.g., "approve," "reject" or "authorize lower-level feature"). However, in some implementations, the indication may comprise a command for the licensing proxy to invoke a rule set to determine such an outcome. For example, the CLM may provide the licensing proxy with data indicating a degree of payment lateness. The licensing proxy may refer to a data structure having feature levels and corresponding degrees of lateness to determine whether a lower-level feature may be approved.

In step 505, the licensing proxy determines whether the requested feature and level are approved. If so, the approval is indicated to the corresponding device. (Step 515.) If not, the licensing proxy may determine whether a lower-level feature may be approved. (Step 510.) The corresponding authorization (step 515) or rejection (step 520) is sent to the appropriate device. The licensing proxy updates a local data structure (step 525). If the licensing proxy makes a local determination regarding, e.g., the authorization of a lower-level feature, the licensing proxy may report the outcome to the CLM.

One of the advantages of the present invention is that hardware and software providers such as IGT may obtain more accurate and timely license usage information. Such information is valuable for many reasons, including but not limited to marketing purposes.

Figure 6:
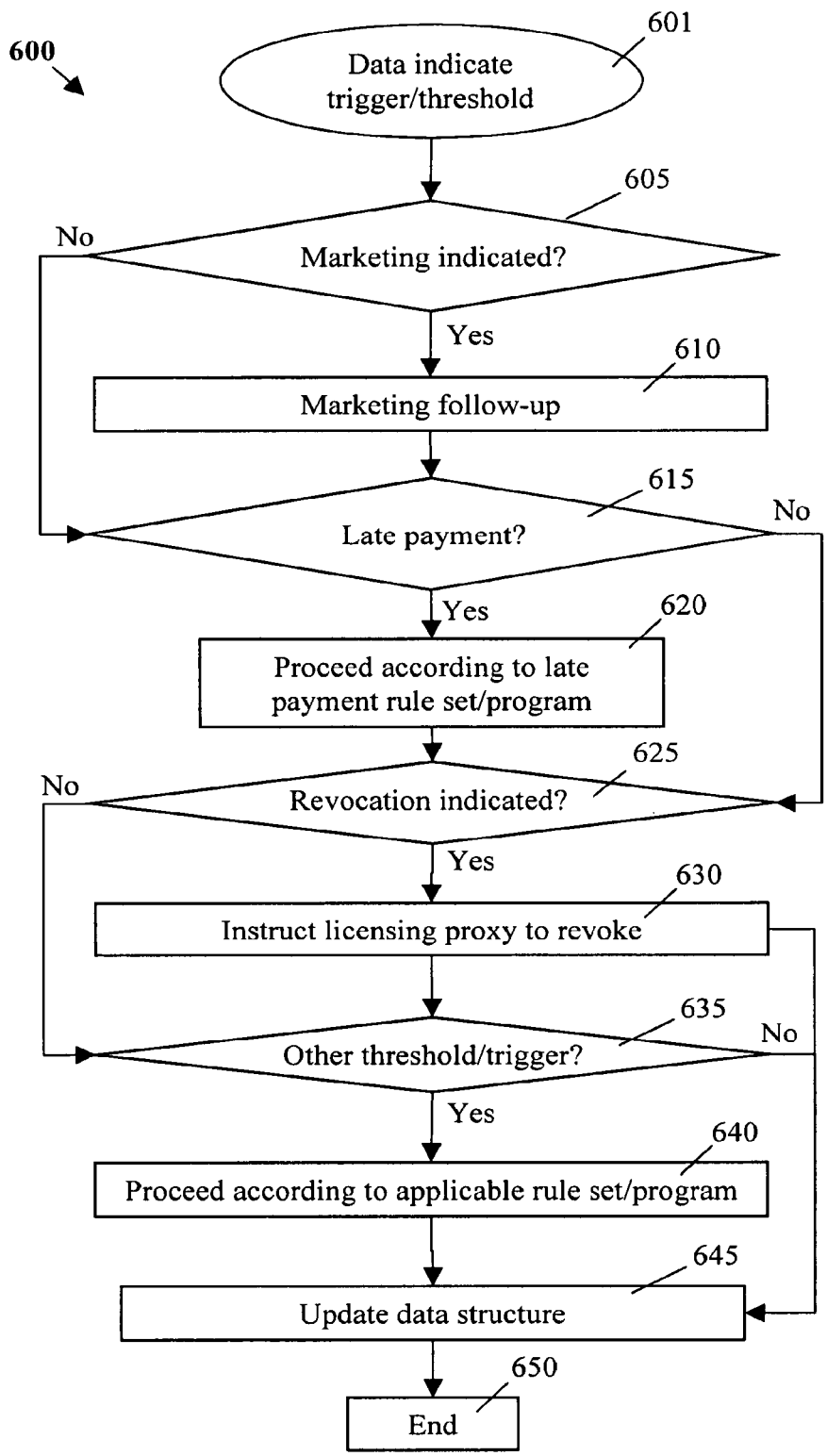
FIG. 6 is a flow chart that outlines a method according to some aspects of the invention.

FIG. 6 outlines the steps of method 600, in which some such information may be put to use in advantageous ways. In step 601, a determination is made that licensing data indicate that a predetermined threshold has been reached.

"Licensing data" (or the like) as used herein includes data other than license usage data, e.g., customer account information.

In step 605, it is determined whether the threshold has marketing implications, according to a predetermined rule set. For example, the licensing data may indicate that a casino is approaching its limit of usage for a particular feature. In one such instance, it may be determined that a casino is within a predetermined number of licenses of its limit of usage for one of IGT's game themes. If so, a marketing response will be invoked. (Step 610.) In some implementations of the invention, triggers may be established for customer relationship management ("CRM") programs according to predetermined licensing data thresholds. The CLM may cause a communication to be sent to the casino and/or to one of IGT's sales personnel indicating the condition.

In response, a sales person may contact the casino and encourage the casino to increase the number of licenses for the feature. If, for example, the customer has a license for up to 500 licenses for a game and IGT has just granted a request for number 450, IGT could contact the customer and suggest an upgrade of the license agreement to include a higher number of licenses. The casino may not be keeping track of what games are "hot" and may not realize that it is close to its license maximum. Timely information provided by the present invention would help IGT provide timely sales and marketing responses.

Conversely, the trigger could be related to low levels of license usage. Suppose, for example, that a customer bought a license for 100 Elvira® games and the licensing data indicate that the games are not being used very often. Perhaps, 2, 3, 4 are being used, fluctuating but e.g., under 10. This kind of pattern could trigger a salesperson to contact the customer (e.g., after a predetermined period of time), to point out the condition and to suggest another type of game that is currently popular in the same area. The salesperson may offer to reduce the Elvira license, credit that license towards a license for another game, etc.

In some instances, the threshold may be related to customer account information, e.g., a late payment threshold. If it is determined in step 615 that such a threshold has been attained, an applicable rule set will be applied. (Step 620.) Some such rules may apply to features having multiple feature levels, as described above. A currently-implemented feature may be downgraded to a lower level, if appropriate.

However, some thresholds may indicate license revocation. (Step 625.) For example, if a client's bill is sufficiently late, revocation may be an appropriate response. If so, the CLM will instruct the licensing proxy to revoke the applicable license. (Step 630.) The CLM may send a command that indicates, in essence, "Revoke license no. _____." The licensing proxy can refer to a data structure to determine what device is running the corresponding software and can instruct the device to stop executing the software. For example, the licensing proxy may instruct an EGM to stop presenting a particular game theme. The EGM will obey and stop presenting the game.

Preferably, the degree of lateness to invoke a revocation process is configurable. Such a rule set preferably involves multiple warnings and several opportunities for the customer to bring its account current. The right to shut down the feature upon non-payment should be in the contract between the licensor and the licensee.

Until the present invention, there has been no convenient way to revoke a customer's license when the customer has not paid its bill. In the past, when a customer did not pay its bill, the licensor may have sent a reminder, then a warning, but had no way of automatically deleting a file from a customer's license manager. The licensor may have, e.g., emailed a revocation to the customer and requested that it be loaded on to the license manager, but the customer had little incentive to comply in a timely manner. Moreover, in the past, the licensor may not have been getting sufficiently timely usage information to know when the customer has cooperated and caused the licenses to be revoked.

A customer may try to thwart the licensing proxy by disconnecting it from the CLM and or the EGMs (or other devices). However, some implementations prevent such problems by establishing a requirement that the licensing proxy stay in communication with the corresponding device or the feature will be shut down. Some such techniques, which may involve polling devices to see if they are still configured for communication, were described in the License Manager application. The CLM may poll the license proxy and the license proxy may poll the in-casino devices (or vice versa). There may be an exchange of challenges and responses, e.g. as described in P253, in order to make sure that the devices running the licensed software and/or the license proxy are not being used as "rogue machines" that allow the unauthorized use of licensed software.

Other thresholds or triggers may be established. If any are determined (step 635), an applicable rule set is invoked. (Step 640.) A data structure should be updated to indicate the current status.

Gaming Machine

Figure 7:
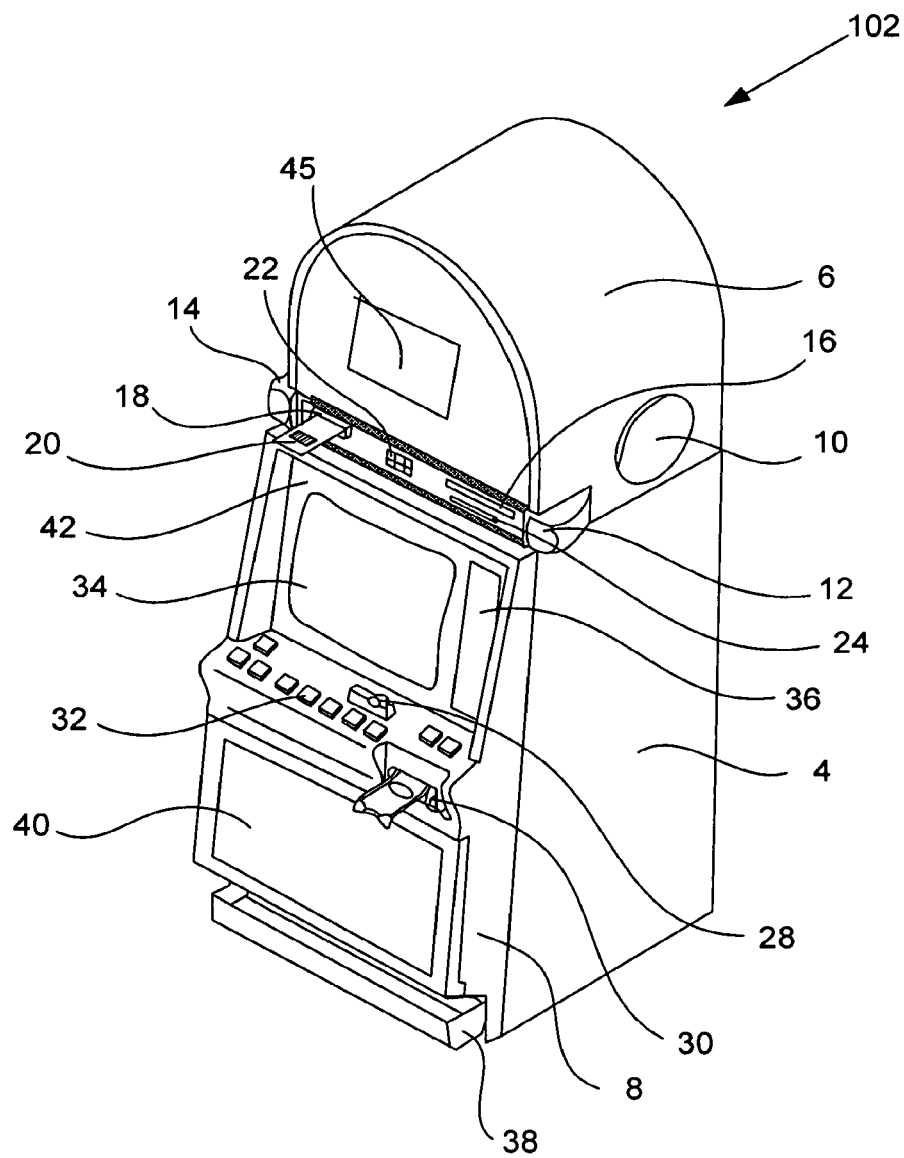
FIG. 7 illustrates a gaming machine that may be configured according to some aspects of the invention.

Turning next to FIG. 7, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

One might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 7, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 8:
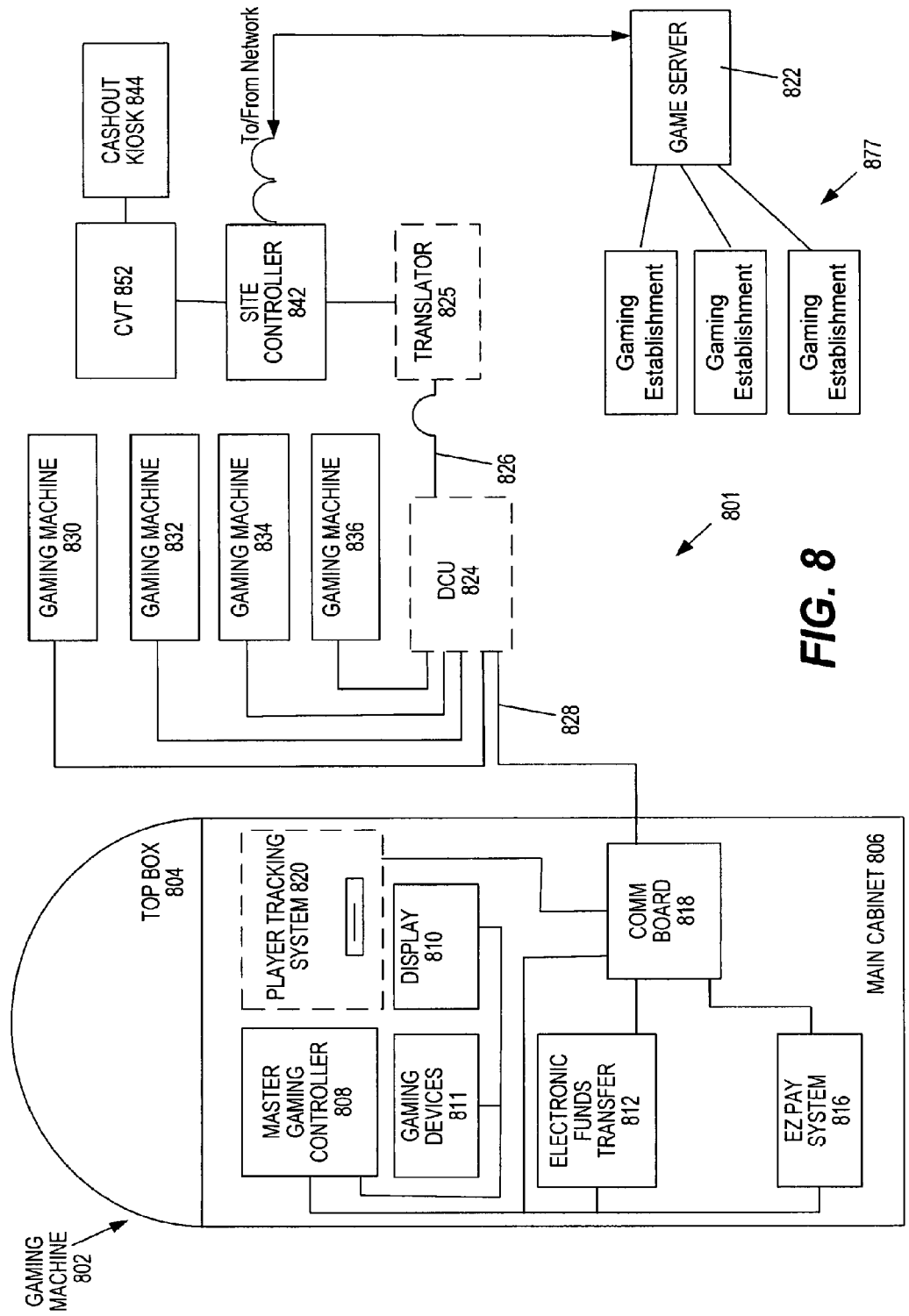
FIG. 8 illustrates a gaming machine and network that may be configured according to some aspects of the invention.

A gaming network that may be used to implement additional methods performed in accordance with embodiments of the invention is depicted in FIG. 8. Gaming establishment 801 could be any sort of gaming establishment, such as a casino, a card room, an airport, a store, etc. In this example, gaming network 877 includes more than one gaming establishment, all of which are networked to game server 822.

Here, gaming machine 802, and the other gaming machines 830, 832, 834, and 836, include a main cabinet 806 and a top box 804. The main cabinet 806 houses the main gaming elements and can also house peripheral systems, such as those that utilize dedicated gaming networks. The top box 804 may also be used to house these peripheral systems.

The master gaming controller 808 controls the game play on the gaming machine 802 according to instructions and/or game data from game server 822 or stored within gaming machine 802 and receives or sends data to various input/output devices 811 on the gaming machine 802. In one embodiment, master gaming controller 808 includes processor(s) and other apparatus of the gaming machines described above in FIGS. 6 and 7. The master gaming controller 808 may also communicate with a display 810.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 808 may also communicate with EFT system 812, EZPay™ system 816 (a proprietary cashless ticketing system of the present assignee), and player tracking system 820. The systems of the gaming machine 802 communicate the data onto the network 822 via a communication board 818.

It will be appreciated by those of skill in the art that embodiments of the present invention could be implemented on a network with more or fewer elements than are depicted in FIG. 8. For example, player tracking system 820 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 824 and translator 825 are not required for all gaming establishments 801. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 842 provides this function for gaming establishment 801. Site controller 842 is connected to a central system and/or other gaming establishments via one or more networks, which may be public or private networks. Among other things, site controller 842 communicates with game server 822 to obtain game data, such as ball drop data, bingo card data, etc.

In the present illustration, gaming machines 802, 830, 832, 834 and 836 are connected to a dedicated gaming network 822. In general, the DCU 824 functions as an intermediary between the different gaming machines on the network 822 and the site controller 842. In general, the DCU 824 receives data transmitted from the gaming machines and sends the data to the site controller 842 over a transmission path 826. In some instances, when the hardware interface used by the gaming machine is not compatible with site controller 842, a translator 825 may be used to convert serial data from the DCU 824 to a format accepted by site controller 842. The translator may provide this conversion service to a plurality of DCUs.

Further, in some dedicated gaming networks, the DCU 824 can receive data transmitted from site controller 842 for communication to the gaming machines on the gaming network. The received data may be, for example, communicated synchronously to the gaming machines on the gaming network.

Here, CVT 852 provides cashless and cashout gaming services to the gaming machines in gaming establishment 801. Broadly speaking, CVT 852 authorizes and validates cashless gaming machine instruments (also referred to herein as "tickets" or "vouchers"), including but not limited to tickets for causing a gaming machine to display a game result and cash-out tickets. Moreover, CVT 852 authorizes the exchange of a cashout ticket for cash. These processes will be described in detail below. In one example, when a player attempts to redeem a cash-out ticket for cash at cashout kiosk 844, cash out kiosk 844 reads validation data from the cashout ticket and transmits the validation data to CVT 852 for validation. The tickets may be printed by gaming machines, by cashout kiosk 844, by a stand-alone printer, by CVT 852, etc. Some gaming establishments will not have a cashout kiosk 844. Instead, a cashout ticket could be redeemed for cash by a cashier (e.g. of a convenience store), by a gaming machine or by a specially configured CVT.

Some methods of the invention combine information that can be obtained from game network accounting systems with features described above. By combining, for example, information regarding scheduled gaming machine configurations and information regarding the amount of money that a gaming machine brings in while a gaming machine has a particular configuration, gaming machine configurations may be optimized to maximize revenue. Some such methods involve determining a first rate of revenue obtained by a gaming machine in the gaming network during a first time when the gaming machine has a first configuration. The gaming machine is later automatically configured according to second configuration information supplied by the SBG server, e.g., as scheduled by the Scheduler. A second rate of revenue, obtained by the gaming machine during a second time when the gaming machine has the second configuration, is determined, and so on.

After scheduling various configurations at various times, optimum configurations for the gaming machine may be determined for various times of day. The SBG system can them provide scheduled optimal configurations for the gaming machine at the corresponding times of day. Some implementations provide for groups (e.g., banks) of gaming machines to be automatically configured according to a predetermined schedule of optimal configurations for various times of day, days of the week, times of the year, etc.

In some such implementations, an average revenue may be computed, based on revenue from many gaming machines having the same configuration at the same time of day. These average revenues could be used to determine an overall optimal value for relevant time periods.

Figure 9:
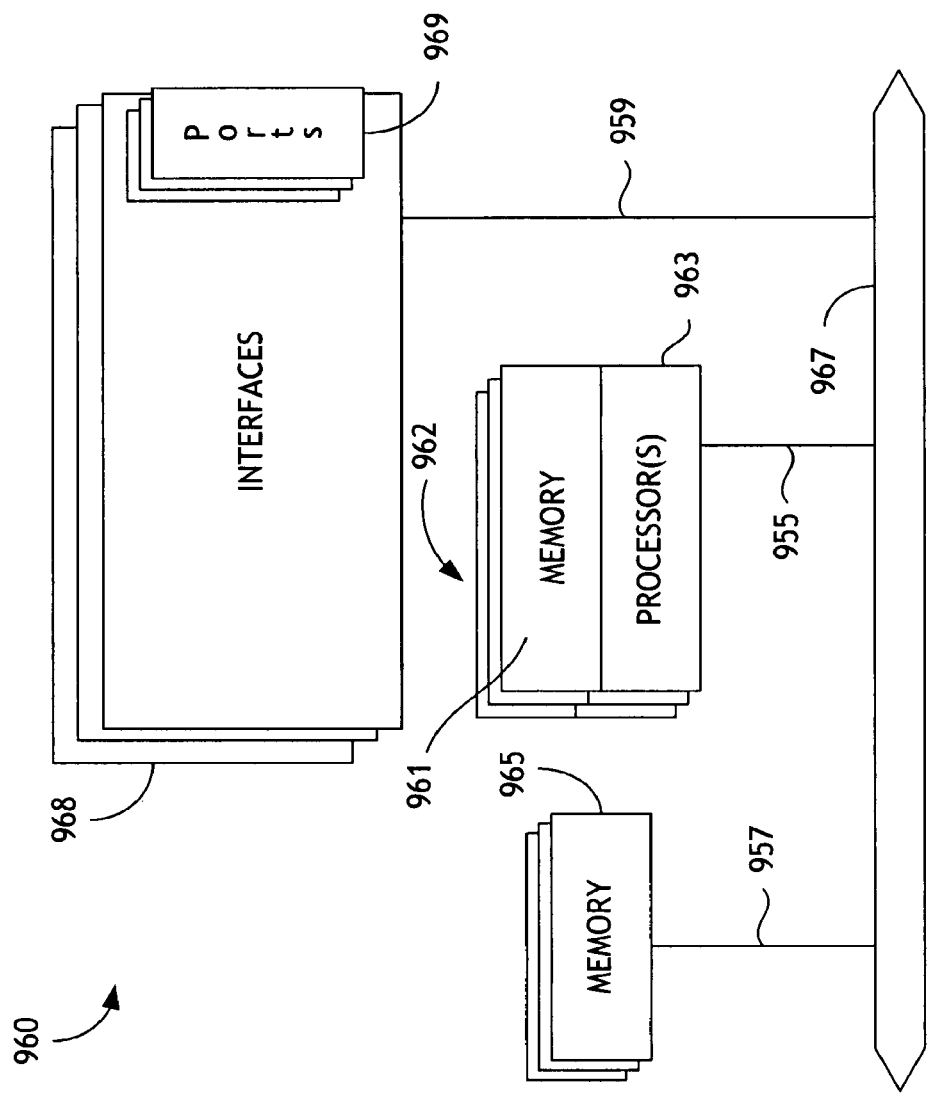
FIG. 9 illustrates a network device that may be configured according to some aspects of the invention.

FIG. 9 illustrates an example of a network device that may be configured for implementing some methods of the present invention. Network device 960 includes a master central processing unit (CPU) 962, interfaces 968, and a bus 967 (e.g., a PCI bus). Generally, interfaces 968 include ports 969 appropriate for communication with the appropriate media. In some embodiments, one or more of interfaces 968 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 968 control such communications-intensive tasks as encryption, decryption, compression, decompression, packetization, media control and management. By providing separate processors for the communications-intensive tasks, interfaces 968 allow the master microprocessor 962 efficiently to perform other functions such as routing computations, network diagnostics, security functions, etc.

The interfaces 968 are typically provided as interface cards (sometimes referred to as "linecards"). Generally, interfaces 968 control the sending and receiving of data packets over the network and sometimes support other peripherals used with the network device 960. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 962 may be responsible for implementing specific functions associated with the functions of a desired network device. According to some embodiments, CPU 962 accomplishes all these functions under the control of software including an operating system and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 9) or switch fabric based (such as a cross-bar).

While this invention is described in terms of preferred embodiments, there are alterations, permutations, and equivalents that fall within the scope of the invention. It should also be noted that there are many alternative ways of implementing the present invention. For example, the present invention may be used to keep track of third party patent licensing this way. For example, a gaming machine provider could keep track of licenses needed for associated peripheral devices. Procedures of the present invention may be implemented for all such "embedded licenses" that are included with an EGM to provide a more accurate count of what a gaming machine provider owes the third party licensors. The count may be updated if, for example an EGM's CPU reports that another type of peripheral device (in this example) has replaced one for which a license was required.

Moreover, licenses may be based on various types of usage that may be tracked and controlled according to the present invention. For example, a license may be based on whether an EGM is configured to provide a game theme, regardless of whether anyone plays the game. The license could also be based on the times during which someone is actually playing a game, which could be tracked effectively using the invention. Alternatively, the license could be based on the level of "coin in" and/or various other factors.

It is therefore intended that the invention not be limited to the preferred embodiments described herein, but instead that the invention should be interpreted as including all such alterations, permutations, and equivalents as fall within the true spirit and scope of the present invention.

I claim:

1. A gaming system comprising:
   a gaming device in a gaming establishment, said gaming device including an acceptor of a physical item associated with a monetary value to facilitate establishment of a credit balance, a first input device actuatable to cause placement of a wager deducted from the credit balance on a play of a wagering game, and a second input device actuatable to initiate a payout associated with the credit balance, said gaming device being configured to display the play of the wagering game;
   a central license manager including a network interface configured to communicate, over a network, with the gaming device, said central license manager including a processor configured to:
   (a) receive a first request, via the network interface, to enable a first feature for the gaming device in the gaming establishment,
   (b) determine whether a predetermined threshold has been reached, said predetermined threshold including a license payment lateness threshold associated with a delay in any payments for any licenses to employ any features in the gaming device, and
   (c) provide a response to the first request, wherein:
      (i) the response is based at least in part upon the determination of whether the predetermined threshold has been reached,
      (ii) if at least the payment lateness threshold has not been reached, enable the first feature for the gaming device in the gaming establishment, and
      (iii) if the payment lateness threshold has been reached, determine whether any different level feature should be enabled on the gaming device.

2. The gaming system of claim 1, wherein the determination that the predetermined threshold has been reached and the response is based, at least in part, on a predetermined rule set applicable to the threshold.

3. The gaming system of claim 1, wherein the processor is further configured to:
   determine a degree of payment lateness; and
   determine whether there is a different level feature that corresponds with the degree of payment lateness.

4. The gaming system of claim 1, wherein the response includes a revocation of a prior authorization to provide the first feature.

5. The gaming system of claim 1, wherein the response includes removing a prior indication to deny all requests for the first feature.

6. The gaming system of claim 3, wherein the processor is further configured to transmit a response authorizing the different level feature in response to the determination that there is a different level feature that corresponds with the degree of payment lateness.

7. The gaming system of claim 3, wherein the processor is further configured to transmit a response that denies the first request in response to the determination that there is no different level feature that corresponds with the degree of payment lateness.

8. The gaming system of claim 7, wherein the processor is further configured to transmit a response that includes instructions to deny all requests for the first feature in response to the determination that there is no different level feature that corresponds with the degree of payment lateness.

9. A gaming system comprising:
   a network interface configured to communicate, over a network, with a gaming device in a gaming establishment, said gaming device including an acceptor of a physical item associated with a monetary value to facilitate establishment of a credit balance, a first input device actuatable to cause placement of a wager deducted from the credit balance on a play of a wagering game, and a second input device actuatable to initiate a payout associated with the credit balance, said gaming device being configured to display the play of the wagering game; and
   a central license manager including, a processor configured to:
   (a) receive a first request, via the network interface, to enable a first feature for the gaming device in the gaming establishment,
   (b) determine whether a predetermined threshold has been reached based on a license payment timeliness data and a status level indicator, the license payment timeliness data represents any delay in any payments for any licenses to employ any features in the gaming device, and the status level indicator represents at least two of: an account status, a payment history, whether the gaming establishment has a license for a different level feature and whether a license has expired, and
   (c) provide a response to the first request, wherein:
      (i) the response is based at least in part upon the determination of whether the predetermined threshold has been reached,
      (ii) if at least the predetermined threshold has not been reached, enable the first feature for the device in the gaming establishment, and
      (iii) if the predetermined threshold has been reached, determine whether any different level feature should be enabled on the gaming device.

* * * * *